United States Patent Office 2,890,107
Patented June 9, 1959

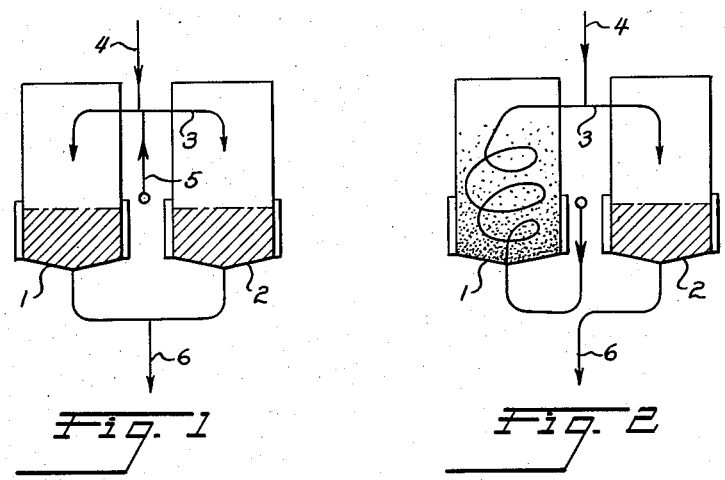
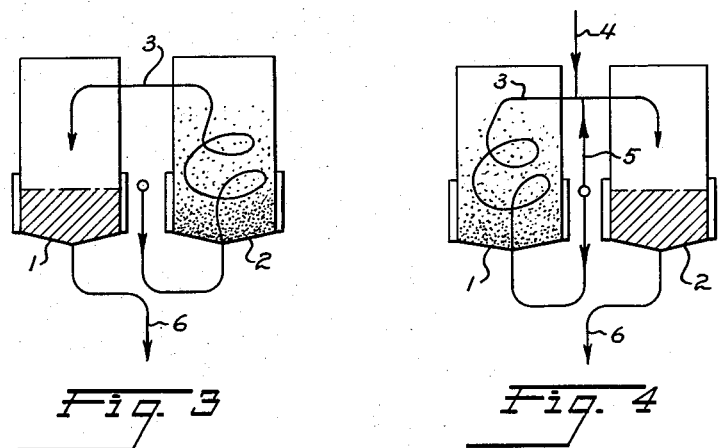
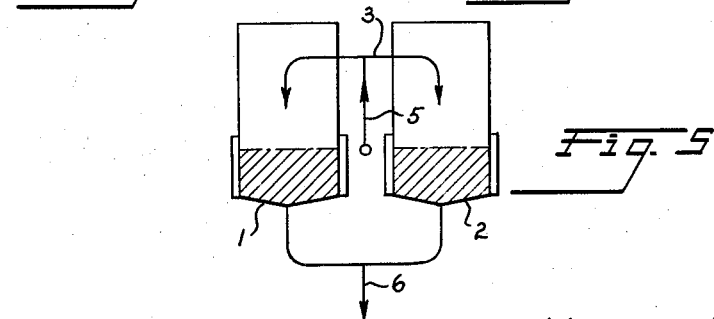
INVENTORS
WILHELM FLESCH
OTTO PISTORIUS
BY *Morgan, Finnegan, Durham & Pine*
ATTORNEYS

2,890,107

PROCESS FOR THE GENERATION OF GAS IN TWO OR MORE PRODUCERS

Wilhelm Flesch, Neckargemund, and Otto Pistorius, Duisburg, Germany

Continuation of application Serial No. 129,202, November 25, 1949. This application September 1, 1955, Serial No. 531,954

Claims priority, application Germany February 14, 1949

7 Claims. (Cl. 48—206)

This application is a continuation of our copending application Serial No. 129,202, filed November 25, 1949, now abandoned.

Plants with two or more gas generators can be worked by the alternate flow of ascending and descending gases in such manner that the ascending gases in one generator become the descending gases in another generator.

The invention relates particularly to the gasification of fine-grained or like comminuted low-grade fuels, which is effected by alternating the gas flows in two or more generators as hereinafter described in detail and which comprises the periodic dressing of each fuel bed by means of fluidization to eliminate cinders. For this purpose, a gaseous medium, preferably one participating in the gasification, for example, steam, or even an inert gas such as nitrogen, is passed at such pressure upwardly through a generator that the fuel bed therein is brought into a fluid-like state. With the individual particles in a fluidized state, the heavier particles, particularly the cinders, sink to the bottom, and the lighter particles are concentrated in the upper part of the fuel bed. After this dressing operation, the bed has a filter-like structure.

A method of carrying out the process according to the invention is as follows. First, the fuel beds in two or more generators are hot-blasted (i.e., heated to white heat) by passing air, oxygen or similar oxygen-containing gas downwardly through each bed. The fuel bed of one generator is then fluidized by passing a gaseous medium upwardly therethrough and the dressing gases leaving the top of that generator are passed downwardly through the static fuel bed of another generator, the hottest zone of which is in the upper part. At the end of the dressing operation in said one generator, and after a short hot-blast period, the dressing operation is similarly carried out in another generator. Finally, another hot-blast period follows. Modifications of the foregoing process by the introduction of other steps, for example, purging with gas, or by changing the sequence of steps are possible as hereinafter described in detail.

Thus, the process according to the invention may be varied so that during the period of gas-downflow in one generator, extraneous gases, for example, the gases, vapors and dust resulting from another gasification process, may be passed downwardly through the fuel bed of filter-like structure. The extraneous gases may result from a continuous or intermittent gasification, for example, of fine-grained or comminuted fuels, or from other processes such as distillation, or from a blast furnace process, or they may be natural gases.

The process according to the invention offers many advantages. The fine-grained fuel cannot clog the bed, since it is frequently dressed. On the other hand, the fine-grained particles are not blown into the plant's exhaust by the fluidized dressing operation but are passed to the hottest part of the fuel bed in another generator so that they are immediately gasified in a place where they cannot cause blockages. Bituminous ingredients of the dressing gas are also gasified in the hot fuel bed and are cracked and converted into permanent gases. If the gaseous medium selected for the fluidized dressing operation is steam, then the steam, at the start of the dressing operation, is partially converted into hydrogen. Thereafter, during the downward passage of the steam, which has not yet been converted, through another generator, the glowing upper part of the fuel bed in said other generator works so actively upon the steam that an optimum volume of water gas is generated.

In each fuel bed, the cinders, which have settled to the bottom during the dressing operation, are not heated to white heat along with the rest of the bed so that the cinders are not melted and clinkered. This follows from the fact that, after the dressing operation, the cinders are in the coldest zone of the generator. Furthermore, the generator grate is subject to diminished thermal stresses.

The operation and construction of the plant are simple inasmuch as the passage of gas between the upper parts of the generators does not have to be interrupted at any stage of the process and it is not necessary to provide a slide valve or the like in the conduit for the hot gas stream flowing between the upper parts of the generators. It is even possible to leave open the pipe through which air or oxygen is introduced into the upper parts of the generators. During the hot-blasting operation, the air, oxygen or other gasifying agent passes uniformly at the same pressure through each generator. During the dressing operation, the pressure of the dressing gas is sufficiently high to prevent the flow of the gasifying agent into the top of the generator in which the fluidized dressing operation is taking place; accordingly, the air or oxygen supplied to the upper parts of the generators passes into another generator along with the dressing gas leaving the generator in which the dressing operation is being performed. The mixture of dressing gas and air or oxygen flows downwardly through the bed of said other generator.

The process according to the invention, as a result of its many advantages, permits of the most economical and fully effective use of fine-grained fuels, in particular all fuels containing tar, without trouble from dust, without fouling conduits with distillation residues, without clinkering of the fuel bed and without danger of explosion. Furthermore, the process permits an extensive adaption to the prevailing conditions and requirements. Thus, according to the process of the invention, fine-grained fuel can also be processed to yield producer gas, water gas or synthesis gas.

In the first case, use is preferably made of air as the gasifying agent and steam is used as the dressing gas. In such case, the dressing period is kept as short as possible since it serves essentially only to loosen the fuel bed and to cause the cinders to sink to the bottom of the bed. The water gas generated during the dressing operation improves the calorific value of the producer gas. For that reason, the two gases are passed together through a generator in which there is gas-downflow.

If, for the hot-blast period, a mixture of oxygen and steam is used instead of air, nitrogen-free water gas or synthesis gas is produced instead of producer gas. The steam used in the fluidized dressing operation also generates water gas which is mixed with the other gas as just described. In this case, the dressing period can be extended if a limited quantity of oxygen is mixed with the steam. It is advantageous, after the dressing operation in one generator has been completed, to hot-blast the generators with gas-downflow before commencing the dressing operation in another generator.

However, it is possible to produce water gas without using oxygen, if the heat necessary for the endothermal water gas process is supplied to the generator from an external source as by means of heating surfaces or electrodes, or by preheating the gasifying agent and fresh fuel.

The yield from the process is greater if, at least in the dressing period, the operation is carried out at high pressures such as are used in steam boilers, that is to say at 20, 30 or even 50 atmospheres absolute pressure. This is particularly advantageous when operating in conjunction with gas power machines.

A further economy is effected if the cinders are sieved immediately after removal, or treated in any other appropriate manner, in order to reclaim the coal not gasified and return it to the generator for further treatment.

In the accompanying drawings, Figures 1, 2 and 3 show the principal gas flows of the process according to the invention.

In Figure 1, two generators are provided with a water or steam jacket; the generators are simultaneously hot-blasted. For this purpose, generators 1 and 2 are connected to each other at the top by pipe 3. To pipe 3 are connected an air or oxygen pipe 4 and a steam pipe 5. The producer gas generated during the hot-blasting period is withdrawn through pipe 6. After both generators are hot-blasted, then steam, for example, is introduced into the bottom of generator 1 at such pressure that the fine-grained fuel is fluidized and the heavy particles, that is to say particularly the cinders, sink to the bottom (Figure 2). A mixture of steam and gases, as well as dust particles entrained therein, escapes from the top of generator 1 and passes through pipe 3 into the top of generator 2 whence it flows downwardly through the hot-blasted fuel bed. The entrained dust is at once gasified, the tar ingredients are cracked and residual steam is converted in the desired manner.

Figure 3 shows the corresponding reversed flow process in which the dressing operation is carried out in generator 2.

The three basic gas flows illustrated, respectively, in Figures 1, 2 and 3 can be used in various sequences and can be modified. For example, it may be necessary to interpose between the hot-blasting step of Figure 1 and the dressing step of Figure 2 or 3 a gas purging step in which steam is introduced into both generators in order to avoid the creation of explosive mixtures before the dressing operation begins.

Another possible method of avoiding the development of explosive mixtures, particularly when working with oxygen, consists in providing in the conduit, which connects the tops of the generators and into which the oxygen flows, a constantly burning small hot flame so that even when the generators are operated at too low a temperature an explosive mixture is avoided.

By dressing with steam, the fuel beds are cooled and thus there is the danger that when both dressing operations of Figures 2 and 3 follow each other the bed 2 of the second dressing operation (Figure 3) will be too cold to crack completely the particles containing tar and to convert the steam. In order to avoid this, a hot-blast operation as illustrated in Figure 1 may be interposed between the dressing operations of Figures 2 and 3 so that the sequence of gas flows is as illustrated in Figure 1, Figure 2, Figure 1, Figure 3. It is an advantage in all of these gas flows that pipe 3 between the upper parts of generators 1 and 2 needs no shut-off device. According to the examples, the air supply is cut off during the purging and dressing operation. In many cases, a separate gas purging step will not be necessary. In such cases, supply pipe 4 may be left open all the time so that the air or oxygen flows in continuously. In the hot-blast period of Figure 1, both generators are connected in parallel. In the fluidized dressing period according to Figure 4, the steam, blown into generator 1 for the dressing operation, forces the air or oxygen into generator 2 so that a mixture of the dressing steam and air or oxygen passes downwardly through generator 2. No particular precaution is necessary against the entry of air or oxygen from pipe 4 into generator 1 because the steam used for the dressing operation has sufficient pressure to prevent the air or oxygen from entering generator 1.

In the production of producer gas, the period of parallel operation (Figure 1) is made as long as possible, and the periods of alternating series flows (Figures 2 and 3) are made as short as possible.

If, on the other hand, it is desired to produce water gas, then operation as illustrated in Figure 1 is continued for as short a time as possible, and the periods of gas flows as illustrated in Figures 2 and 3 are extended for as long as possible. In the preparation of water gas, it is also possible to proceed in such manner that, after the hot-blasting operation according to Figure 1, the dressing operation does not begin immediately, but only after passing steam downwardly through the two generators in parallel for a period, as shown in Figure 5, in order to generate high-grade water gas in the hot fuel bed. Thereafter, the dressing operations according to Figure 2 or 3 can be started. Here again, the dressing operations of Figures 2 and 3 may succeed each other immediately or a hot-blast operation according to Figure 1 together with a water gas generating operation according to Figure 5 may be interposed between the dressing operations of Figures 2 and 3.

The process according to the invention, in all of its embodiments, produces a high-grade gas, free of dust and tar impurities. It utilizes the fuel to the fullest possible extent and operates without trouble since the cinders are accumulated only in particles of moderate size and, therefor, are easily removable at the bottoms of the fuel beds.

The charging of the generators is best carried out during the dressing operation. The dust is thus immediately drawn into the gasification process, it will not cause clogging or any similar trouble and it will not be blown out of the system.

If it is desired to produce town gas, that is to say a gas with a high content of hydrocarbons such as methane and like gases, then the fresh fuel is not introduced into the generator until the second half of the dressing period.

In general, the solids fuels may to a greater or lesser extent be replaced by liquid or gaseous fuels.

The economy of the process is still further improved if, instead of using the smallest coal particles, a mixture of small and coarser coal particles is introduced into the generator; the fuel bed can then be maintained at a greater height and thus afford a greater heating capacity. From this follows the possibility of extending the gas production periods, and thus raising the efficiency of performance of the generators.

If it is desired to work with the highest possible temperatures, then superheated steam, air or oxygen may be introduced into the fuel bed during the dressing operation. In such case, however, at least the greater part of the superheated steam or the heat-producing oxygen-containing gas is introduced above the layer of cinders resting on the grate so that the cinders which still contain particles of coal will not be heated and clinkered.

The use, in the dressing operation, of gasifying agents which contain free oxygen and/or which are highly superheated, is of great importance in the gasification of fuels containing tar. The tar in the fresh coal introduced into a generator during the dressing operation must be completely distilled during this operation because otherwise it is freed in the subsequent gas-downflow period and then adheres to the grate thus making the downflowing gas impure. The sensible heat of the coal charge is often insufficient for the complete distillation of the fresh coal during the dressing operation. If, an addition, during the dressing operation, only gasifying agents with oxygen in a combined state, such as steam or carbon dioxide, are used, then a further part of the sensible heat of the fuel bed is used for heating and cracking the gasifying agent. By completely or partially replacing such gasifying agents with agents containing free oxygen, the predominantly endothermal process becomes a predominantly exothermal process. The coal charge of the dressing operation can thus be maintained for a sufficient time at a sufficiently high temperature to distill the fresh coal completely and to crack the distillation products thoroughly. This high temperature for the coal charge further favors the separation of the cinders with an appreciably lesser use of moving devices.

The most favorable results for the dressing operation occur when about two-thirds of the gas necessary to effect fluidization and gasification are introduced into the generator from the side thereof and about one-third of this gas is introduced below the grate.

If a gasifying agent, which has been highly preheated, is introduced into the generator from its side, then the present operation may be prolonged. It is then possible to work with dressing periods of six minutes or longer.

The introduction of the gasifying agent above the cinder layer may be made not only through the side of the generator casing but also from below by means of branch pipes passing up through the grate and projecting above the cinder layer. The tops of such pipes may be provided with a shield or similar cover.

What is claimed is:

1. A process for the generation of gas consisting essentially of water gas from fine-grained fuel in at least two generators, which comprises the steps of passing a gasifying agent downwardly simultaneously through settled beds of said fuel in said generators to effect heating of said beds, thereafter passing steam downwardly simultaneously through the thus heated beds, dressing one of said beds by passing a dressing gas upwardly therethrough at a pressure sufficient to fluidize said one bed and thereby cause cinders therein to sink to the bottom of said one bed, passing said dressing gas leaving said one fluidized bed downwardly through another of said beds, thereafter dressing said other bed by passing a dressing gas upwardly therethrough at a pressure sufficient to fluidize said other bed and thereby cause cinders therein to sink to the bottom of said other bed, passing said dressing gas leaving said other fluidized bed downwardly through said one bed, and removing cinders from the bottom of each of said beds.

2. The process of claim 1 wherein said gasifying agent continues to pass downwardly through one of the beds while the dressing gas is passing upwardly through another of said beds.

3. The process of claim 1 wherein the steps of passing said gasifying agent and then passing steam downwardly through the beds in at least two generators are repeated each time the dressing step has been completed in one of said beds.

4. A process for the generation of gas consisting essentially of water gas from a fine-grained fuel in a plurality of generators, which comprises the steps of passing a gasifying agent consisting essentially of oxygen and steam downwardly through settled, parallel beds of said fuel in said generators to effect exothermic reaction thereby heating said parallel beds and endothermic reaction thereby producing water gas, flowing a dressing gas upwardly through one of the thus heated beds at a pressure sufficient to fluidize said one bed and cause cinders therein to settle to the bottom thereof, passing said dressing gas along with entrained particles from said one fluidized bed downwardly through and on top of another of said heated beds flowing another dressing gas upwardly through said other bed at a pressure sufficient to fluidize said other bed and cause cinders therein to settle to the bottom thereof, passing said last mentioned dressing gas along with entrained particles from said other fluidized bed downwardly through and on the top of said one bed, and removing the settled cinders from the bottom of each of said beds.

5. The process of claim 4 wherein a fresh charge of the fine-grained fuel is introduced into each generator while the bed in said generator is fluidized.

6. The process of claim 4 wherein the gasifying agent continues to pass downwardly through one of the beds while the gasiform stream is flowing upwardly through another of said beds.

7. The process of claim 4 wherein the step of passing gasifying agent downwardly through the settled, parallel beds is repeated each time the fluidization of one of said beds has been terminated.

References Cited in the file of this patent

UNITED STATES PATENTS

| 1,160,908 | Koster | Nov. 16, 1915 |

FOREIGN PATENTS

| 148,753 | Germany | Mar. 7, 1904 |
| 21,317 | Great Britain | Oct. 4, 1904 |

OTHER REFERENCES

Gumz: "GWF," vol. 88, No. 5, pp. 133–134 (1947).